(12) United States Patent
Bachmann et al.

(10) Patent No.: US 6,203,839 B1
(45) Date of Patent: Mar. 20, 2001

(54) FLAVORANT COMPOSITIONS

(75) Inventors: Jean-Pierre Bachmann, Wädenswil; Markus Gautschi, Zeiningen; Bernhard Hostettler, Gockhausen, all of (CH); Xiaogen Yang, West Chester, OH (US)

(73) Assignee: Givaudn Roure (International) SA (CH)

( * ) Notice: Subject to any disclaimer, the term of this patent is extended or adjusted under 35 U.S.C. 154(b) by 0 days.

(21) Appl. No.: 09/212,985

(22) Filed: Dec. 16, 1998

(30) Foreign Application Priority Data

Dec. 22, 1997 (EP) .................................. 97122633

(51) Int. Cl.$^7$ .................................................. A23B 1/226
(52) U.S. Cl. ......................... 426/546; 426/538; 426/650; 426/638
(58) Field of Search ..................... 426/546, 533, 426/534, 650, 538, 590, 638; 424/195.1

(56) References Cited

U.S. PATENT DOCUMENTS

| | | | | |
|---|---|---|---|---|
| 4,376,115 | * | 3/1983 | McCrorey | 424/145 |
| 5,683,698 | * | 11/1997 | Chavali et al. | 424/195.1 |
| 5,811,458 | * | 9/1998 | Reichling et al. | 514/548 |

OTHER PUBLICATIONS

Kondo, et al., "1'-Acetoxychavical acetate as a potent inhibitor . . . ", *Biosci. Biotech. Biochem.*, 57 (8)1344–45, 1993.*

Horz et al., *Allylphenol Biosynthesis in a Transformed Root Culture of Coreopsis Tinctoria: Side–Chain Formation*, Phytochemistry, vol. 33, No. 2, pp. 349–351 (1993).

Deigner et al., *1'–Hydroxyeugenol– and Coniferyl Alcohol Derivatives as Effective Inhibitors of 5–Lipoxygenase and Cu2+–mediated Low Density Lipoprotein Oxidation*, Arzneim.–Forsch./Drus Res. 44 (II), Nr. 8 (1994).

Fuzatti Sutarjadi et al., *Phenylpropane Derivatives From Roots of Cosmos Caudatus*, Phytochemistry, vol. 39, No. 2, pp. 409–412 (1995).

Janssen et al., *Acetoxychavicol Acetate, an Antifungal Component of Alpinia galanga*, Planta Medica (1985) 507–511.

Kondo et al., *1'Acetoxychavicol Acetate as a Potent Inhibitor of Tumor Promoter–induced Epstein–Barr Virus Activation from Languas galanga, a Traditional Thai Condiment*, Biosci. Biotech. Biochem. 57(8) (1993) 1344–1345.

Itokawa et al., *Antitumour Principles from Alpina galanga*, Planta medica (1987) 32–33.

Thresh, J.C., *Capsaicin, the Active Principle of Capsicum Fruits*, The Pharmaceutical Journal and Transactions, p. 21 (Jul. 8, 1876).

Szolcsányi, J., *Capsaicin Type Pungent Agents Producing Pyrexia*, Handbook of Experimental Pharmacology, vol. 60, Ch. 14, pp. 437–478 (1982).

Mitsui et al., *Constituents from Seeds of Alpinia galanga Wild, and Their Anti–ulcer Activities*, Chem. Pharm. Bull. 24 (10) (1976) 2377–2382.

Cazenueve et al., *Extraction et dosage de la pipérine dans les poivres*, Mémoires présentés à la Société Chimique, Chem. Pharm. Bull. (1877), 27, 290–291.

Noro et al., *Inhibitors of Xanthine Oxidase from Alpina galanga.*, Chem. Pharm. Bull. 36 (1) (1988) 244–248.

Szallasi, Arpad and Peter M. Blumberg, *Mechanisms and Therapeutic Potential of Vanilloids (Capsaicin–like Molecules)*, Adv. Pharmacol. 24 (1993) 123–155.

Mori et al., *Potent Aroma Components of Rhizomes from Alpinia galanga Wild. L*, Nippon Shokuhin Kagaku Kogaku Kaishi vol. 42 (12) (1995) pp. 989–995 (English Abstract).

Szallasi, Arpad, *The Vanilloid (Capsaicin) Receptor: Receptor Types and Species Differences*, Gen. Pharmac. vol. 25, No. 2, pp. 223–243 (1994).

Micko, Karl, *Zur Kenntniss des Capsaïcins*, Z. Nahr. Genussm 1, pp. 818–829 (1898) (No English Translation).

* cited by examiner

Primary Examiner—Keith D. Hendricks
(74) Attorney, Agent, or Firm—Wood, Herron & Evans, L.L.P.

(57) ABSTRACT

The invention is related to a flavorant composition containing 1'-acetoxychavicol acetate and 1'-acetoxyeugenol acetate derivatives thereof as well as a flavorant acceptable carrier. The flavorant composition may be used for flavoring foods, beverages or healthcare products with warm/hot, spicy and pungent sensations related to Galangal.

2 Claims, No Drawings

FLAVORANT COMPOSITIONS

The present invention relates to a flavorant composition exhibiting warm/hot, spicy and pungent sensations related to Galangal. More particularly, it relates to a flavorant composition comprising at least one 1'-acetoxychavicol acetate or 1'-acetoxyeugenol acetate derivative. The present invention also relates to food, beverages or healthcare products containing a flavorant composition of the present invention as well as a method of flavoring food, beverages or healthcare products using the flavorant composition.

Hot Peppers like red pepper (*Capsicum annuum* L.)—in Europe also known as Paprika—and chili pepper (*Capsicum frutescens* L.) comprise an essential ingredient in a number of Asian and European cuisines. It is well known from Thresh et al., *Pharm. J. and Trans.* (1876), 7, 21; Micko et al., *Z. Nahr. Genussm.* (1898), 1, 818 or A. Szallasi, P. M. Blumberg, *Adv. Pharmacol.* (1993), 24, 123 that Capsaicin is the active ingredient in hot peppers of the plant genus Capsicum. As mentioned in A. Szallasi, *Gen. Pharmac.* (1994), 25, 223 the oral consumption of hot peppers leads to profuse perspiration which ultimately leads to heat loss. This well established effect, which is known as gustatory sweating, is most probably the reason for the high popularity of hot peppers in countries in hot climates, as well as the flavoring of food.

Capsaicin is one of the most active members of a class of compounds commonly referred to as capsaicinoids, see J. Szolcsanyi in, *Handbook of Experimental Pharmacology*, A. S. Milton, Ed., Vol. 60, pp. 437–478, Springer, Berlin, (1982). Other well known compounds of this class are Piperine, the active ingredient in black pepper (*Piper nigrum* L.), see Cazeneuve et al., *Bull. Soc. Chim. France.* (1877), 27, 291, and Gingerol, the active ingredient in ginger (*Zingiber officinale* R.).

Galangal (also called galanga, galingale, galangale, calangall) is the name for a member of the monocotyledonus family Zingiberacea. *Alpinia officinarium*, the smaller Galangal, is native to southern China, while the greater Galangal, *Alpinia galanga* or *Languas galanga*, is a larger plant native to Java and Malaya. *Alpinia galanga* is a stemless perennial herb with fragrant short living flowers. The reddish-brown rhizomes of this plant having a spicy aroma and a pungent taste somewhere in between pepper and ginger are used as spice and especially as ginger substitute for flavoring foods, e.g. meat, rice or curry. Galangal oleoresin is used as a modifier for ginger, cardamom, allspice, nutmeg etc. with which it blends favorably. The oleoresin remains, however, a rarity and specialty, which is offered by flavor supply houses.

The compounds 1'-acetoxychavicol acetate and 1'-acetoxyeugenol acetate are known compounds. They have been isolated from *Alpinia galanga* and are described to have anti-tumor activity (see H. Itokawa et al., *Planta Medica* (1987), 32–33), to inhibit xanthin oxidase (see T. Noro et al., *Chem. Pharm. Bull.* (1988), 36, 244) and to have anti-fungal activity (see A. M. Janssen et al., *Planta Medica* 1985, 507). Furthermore, 1'-acetoxychavicol acetate is described to have anti-ulcer activity (see S. Mitsui et al., *Chem. Pharm. Bull.* (1976), 24, 2377) and to be a potent inhibitor of the tumor promoter-induced Epstein-Barr virus activation (see A. Kondo et al., *Biosci. Biotech. Biochem.* (1993), 57,1344). H. Mori et al., *Nippon Shokuhin Kagaku Kogaku Kaishi* (1995), 42, 989. 1'-acetoxychavicol acetate is an aroma constituent of Galanga as determined by GC olfactometry, i.e. they determined only the retronasal aroma by GC sniffing without having tested the trigeminal effect of this constituent.

SUMMARY OF THE INVENTION

The present invention provides 1'-acetoxychavicol acetate and 1'-acetoxyeugenol acetate and derivatives thereof which exhibit a strong trigeminal effect which causes a warm/hot, spicy and pungent sensation perceived upon tasting any form of spice which is related to Galangal.

The present invention also provides a method of flavoring food, beverage or healthcare products using the flavorant composition of the present invention as well as the flavored food, beverage or healthcare products.

DETAILED DESCRIPTION OF THE INVENTION

According to the invention at least one compound selected from the group consisting of 1'-acetoxychavicol acetate, 1'-acetoxyeugenol acetate and related compounds of formula I

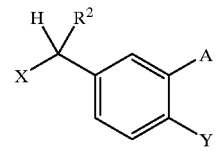

wherein
A=H, OR$^4$
X=OH, OCOR$^1$
Y=H, OCOR$^3$ and
  R$^1$, R$^3$=H, branched or unbranched C$_{1-6}$ alkyl, C$_{2-6}$ alkenyl, C$_{2-6}$ alkinyl,
  R$^2$=H, branched or unbranched, substituted or unsubstituted C$_{1-6}$ alkyl, C$_{2-6}$ alkenyl, C$_{2-6}$ alkinyl, C$_3$–C$_6$ carbocycle,
  R$^4$=branched or unbranched C$_{1-6}$ alkyl, C$_{2-6}$ alkenyl, C$_{2-6}$ alkinyl,
is added to a flavorant acceptable carrier to produce a flavorant composition exhibiting warm/hot, spicy and pungent sensations related to Galangal.

The effect is somewhat similar to those elicited by capsaicin and other capsaicinoids derived from hot peppers, by piperine derived from black pepper, by gingerols derived from ginger and by isothiocyanates derived from mustard. However, all of the latter compounds impart usually long-lasting sensations which are very often undesirable, especially if spicy foods are consumed with more delicately flavored food and/or drink, e.g. with red wine. In contrast, the flavorant composition according to the invention surprisingly produce a pungency of relatively short duration, which makes them ideal for flavoring foods where a lingering effect is undesirable.

In addition, the flavorant compositions of the invention have a warming, alcohol-boosting effect in alcoholic beverages, e.g. making a beverage containing about 15% alcohol taste like one containing about 30% alcohol.

The flavorant composition comprising the compounds of formula I may be used in either enantiomeric form, in any ratio of enantiomers or in racemic form.

The flavorant composition of the invention exhibits Galangal related effects of warm/hot, spicy and pungent sensations to food products, beverages and consumer healthcare products, e.g. mayonnaise, sour cream, onion dip, vegetable dip, potato chip snack, chewing gum, hard candy, mouthwash, toothpaste, etc.

The novel compounds of the flavorant compositions are listed in Table I.
TABLE I
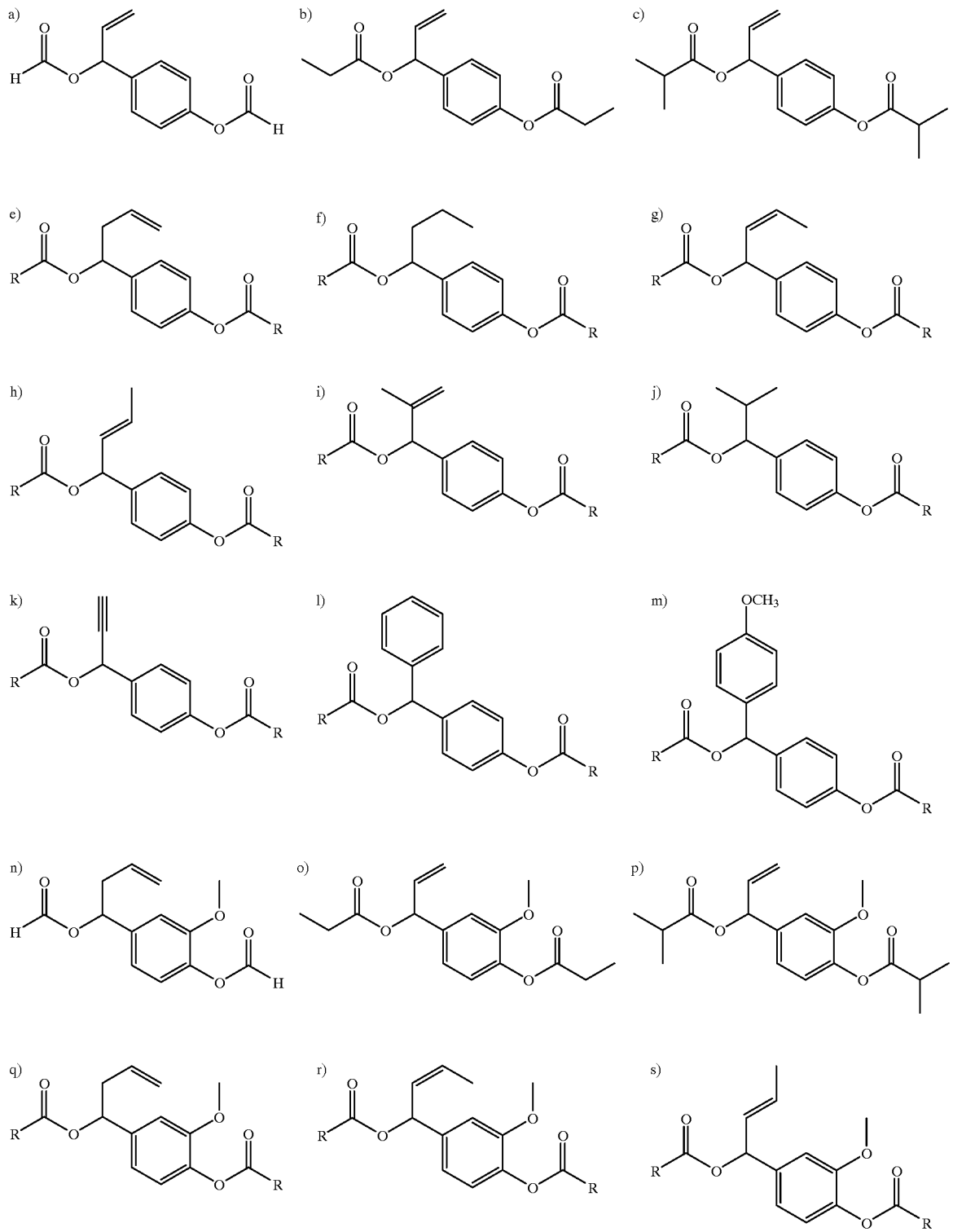

TABLE I-continued

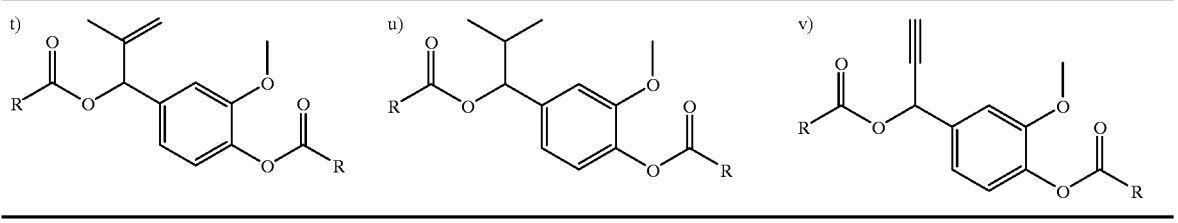

wherein R is H, CH$_3$, CH$_2$CH$_3$, or CH(CH$_3$)$_2$.

All these compounds exhibit the above mentioned warm/hot, spicy and pungent sensations and are preferred. The most preferred compounds for the use in flavorant compositions are listed in Table II.

The flavorant compositions may be naturally occuring and are therefore preferred. The compounds of formula I, preferably those of Table I, more preferably those of Table II, might be used to generate the above mentioned effects in a variety of food, beverages or consumer healthcare products,

TABLE II

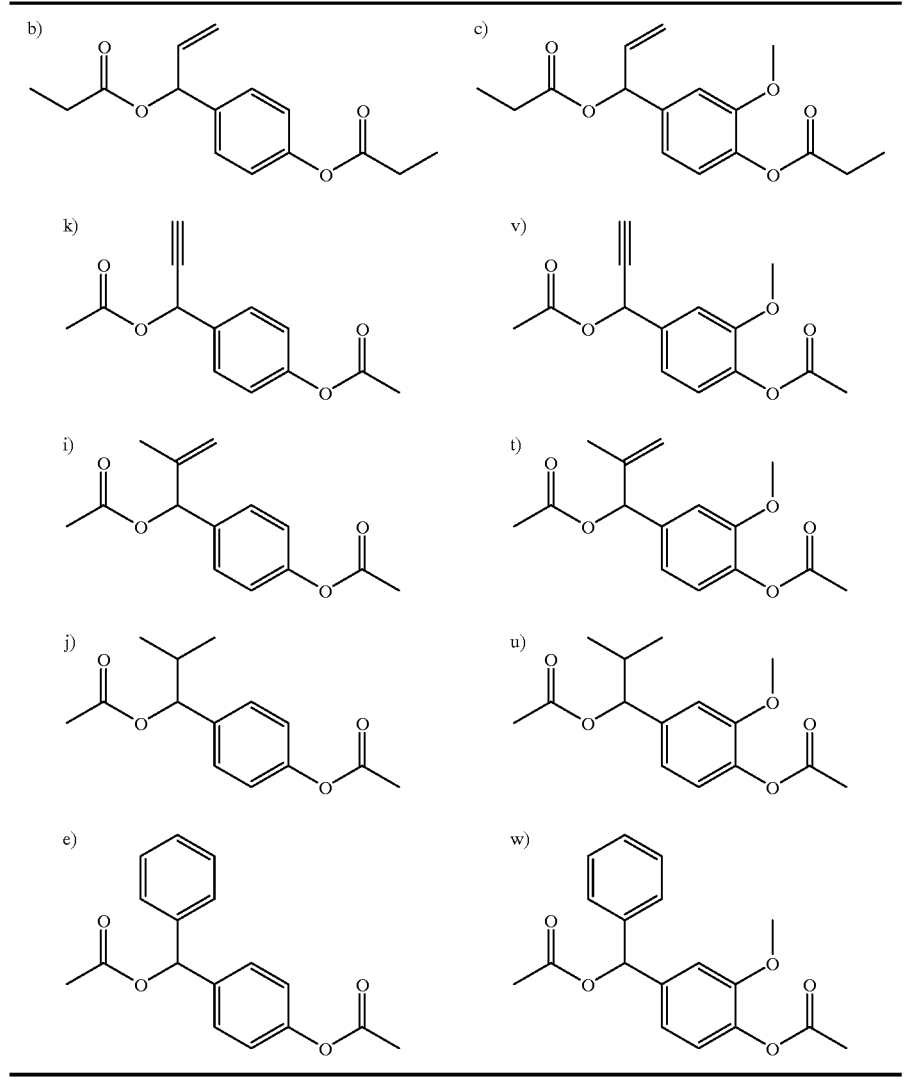

Thus, according to the invention a flavorant composition contains at least one synthetically prepared compound of formula I and a flavorant acceptable carrier and exhibits warm/hot, spicy and pungent sensations related to Galangal.

e.g. in hard candy, chewing gum, mayonnaise, sour cream, onion and other vegetable dips, potato chip snack, alcoholic cordial, mouthwash and toothpaste. The compounds of formula I do not suffer the serious disadvantage of lingering hotness nor do they exhibit other negative effects characteristic of lingering food ingredients like capsaicin, gingerol and piperine.

Further, the appropriate compounds for the flavorant composition may be readily prepared by methods known to those skilled in the art. The preferred method for the preparation of compounds of formula I involves the following steps a) to d):

a) A halo-alkane-, alkene-, or alkine of type $R^2X$, where X is a halogen atom and $R^2$ has the above defined meaning, is reacted with magnesium to form a Grignard reagent of type $R^2MgX$. The reaction with magnesium is preferably carried out in tetrahydrofuran (THF), however, other solvents such as diethyl ether may also be used. The ratio of magnesium to halo-alkane-, alkene-, or alkine $R^2X$ is preferably from 1 up to about 5 moles of magnesium per mole of $R^2X$, more preferably, from 2 up to 3 moles of magnesium per mole of $R^2X$. The reaction is carried out at a temperature from 10° C. up to about 50° C., preferably at a temperature from 40° C. up to about 50° C. Temperatures lower than 20° C. give rise to a reaction which is too slow to be economical. Temperatures higher than 50° C. give rise to side reactions causing an undue lowering of yield of product.

b) The Grignard reagent of type $R^2MgX$ produced in step a) is then reacted with a benzaldehyde derivative. The mole ratio of $R^2X$ prepared in step a) to benzaldehyde is from about 2 up to about 6 moles of $R^2X$ used per mole benzaldehyde derivative, more preferably from 3 up to 5 moles of $R^2X$ per mole of benzaldehyde derivative. The aldehyde may be added to the Grignard reagent in neat form or dissolved in an inert solvent such as tetrahydrofuran and diethyl ether, most preferably the benzaldehyde derivative is added in form of a tetrahydrofuran solution. The reaction is carried out at a temperature of between –20° and up to 50°, preferably at about 30° C. The reaction mixture may be hydrolized with mineral acid, e.g. hydrochloric acid, sulfuric acid, or with saturated ammonium salt solutions, e.g. ammonium chloride or ammonium sulfate. Most preferably ammonium chloride is used for the hydrolysis. The Grignard reaction products may be purified by a chromatography method or may be used in crude form for the next step.

c) The Grignard addition products are finally acylated to give the desired compounds of formula I. The acylation may be carried out in a tertiary amine such as pyridine, triethyl amine, preferably pyridine. Most preferably pyridine is used in combination with a catalytic amount of 4-N,N-dimethylaminopyridine. As acylating agents acid chlorides or acid anhydrides may be used, preferably the acid anhydrides are used.

The compounds of formula I may preferably be purified by chromatography or by crystallization methods.

An alternative method of preparing compounds of the formula I involves the following steps:

a) An alkyl-, alkenyl-, or alkinyl metal derivative of type $R^2M$, where $R^2$ has the above defined meaning and M represents an alkali metal (e.g. Li, Na, K), is reacted with the corresponding benzaldehyde derivative. Alkyl-, alkenyl-, or alkinyl metal derivative of type $R^2M$ are commercially available or may be readily prepared by methods known to those skilled in the art. The ratio of $R^2M$ to benzaldehyde derivative is preferably from 2 up to 5 moles of $R^2M$ per mole benzaldehyde derivative. The reaction is carried out in an inert solvent such as tetrahydrofuran (THF), diethyl ether, benzene and xylenes. The aldehyde may be added to the $R^2M$ reagent in neat form or dissolved in an inert solvent such as tetrahydrofuran and diethyl ether, most preferably the benzaldehyde derivative is added in form of a tetrahydrofuran solution. The reaction is carried out at a temperature of between –20° and 50°, preferably at about 30° C. The reaction mixture may be hydrolized with mineral acid, e.g. hydrochloric acid or sulfuric acid, or with saturated ammonium salt solutions, e.g. ammonium chloride or ammonium sulfate. Most preferably ammonium chloride is used for the hydrolysis. The reaction products may be purified by chromatography or may be used in crude form for the next step.

b) The addition products of $R^2M$ to the benzaldehyde derivatives are finally acylated to give the desired compounds of the formula I. The acylation may be carried out in a tertiary amine such as pyridine, triethyl amine, preferably pyridine is used as the solvent, most preferredly pyridine and a catalytic amount of 4-N,N-dimethylaminopyridine is used. As acylating agents acid chlorides or acid anhydrides may be used, preferably the acid anhydrides are used.

The products of formula I may be purified by chromatography or by crystallization.

The following examples 1–16 are presented for purposes of illustration of the general procedure for the preparation of compounds of formula I and are not to be construed in a limiting sense.

The present invention is described further in the following examples which are presented solely for the non-limiting purpose of further illustrating the invention.

EXAMPLE 1
(rac)-acetic acid 1-(4-acetoxy-phenyl)-allyl ester (1)

A 2.5 l sulfonation flask equipped with stirrer, thermometer, reflux condenser, addition funnel and bubble counter connected to an argon flask is charged with 92.2 g Mg turnings, (4.0 mol) and 150 ml THF. After the system has been flushed with argon one iodine crystal is added followed by 30 drops of a solution of 192.6 g vinyl bromide (1.8 mol) in 300 ml THF. Using an oil bath, the reaction flask is heated to 70° and one drop of bromine is added. After ignition of the Grignard-reaction the oil bath is removed and the vinyl bromide-THF solution is added steadily at ambient temperature over a period of 6 hours. Stirring is continued for another 30 minutes and the cloudy, black-grey mixture obtained is cooled to 0° with an ice bath. After dilution with 600 ml THF, a solution of 61.05 g 4-hydroxy-benzaldehyde (0.5 mol) in 150 ml THF is added under efficient cooling (ice bath) over a period of 30 minutes. The thick, but stirrable suspension obtained is stirred at room temperature overnight and then cooled to 0° C. Under vigorous stirring a solution of 133.7 g $NH_4Cl$ (2.5 mol) in 350 ml $H_2O$ is added very carefully over a period of 1.5 hours. The suspension obtained is stirred for another 1.5 hours, the precipitated solids are separated by filtration and the reaction vessel is rinsed several times with a total of 600 ml MTBE. The combined organic layers are washed 2× with 500 ml water, 2× with 500 ml aq. $NaHSO_3$ (10%), 2× with 500 ml $H_2O$, 1× with 500 ml satd. $NaHCO_3$ and 2× with 500 ml brine/water ca 2:1. Each aqueous phase is extracted 1× with 500 ml MTBE, the combined organic phases are dried over $MgSO_4$ and concentrated in vacuo. The crude product is purified by flash chromatography (silica gel 60, Merck Flash; 30 cm column with 7.5 cm diameter; solvent:hexane/MTBE 1:1) to give 56.0 g (75%) 4-(1-hydroxyallyl)-phenol in form of a yellowish, viscuous oil that slowly crystallizes.

A 1.0 l sulfonation flask equipped with stirrer, thermometer, reflux condenser, addition funnel and bubble counter connected to an argon flask is charged with 56.0 g diol and 70.5 ml acetic anhydride. Under stirring and cooling with an ice bath 105.4 ml pyridine (1.31 mol) is added over 15 minutes at such a rate that the temperature does not exceed 30° C. The ice bath is removed, stirring is continued for 15 min. at room temperature and then 0.41 g DMAP (3.4 mmol) is added. The mixture is stirred at room temperature for 21 hours, transferred to a separatory funnel, diluted with 500 ml MTBE and finally washed 2× with each 300 ml $H_2O$, 2× with each 200 ml 2N HCl (1.2 mol) and some ice, 1× with 300 ml $H_2O$, 2 with each 300 ml aq. $NaHSO_3$ (10% by weight), 1× with 300 ml $H_2O$, 1× with 300 ml saturated $NaHCO_3$ and 2× with each 300 ml brine/water (about 1:1). Each aqueous phase is extracted 1× with 500 ml MTBE, the combined organic phases are dried over $MgSO_4$ and concentrated in vacuo. The crude oil is dissolved in 20 ml toluene and 45 ml hexane under warming, the solution is cooled to room temperature, inoculated with a crystal of pure material and stored in the refrigerator (4° C.) overnight. The formed crystals are separated, washed with 200 ml ice cold hexane and dried to give 56.8 g (66% by weight) 1'-acetoxychavicol acetate 1 having the following $^1H$ NMR ($CDCl_3$) values: 2.10 (s, $CH_3$); 2.30 (s, $CH_3$); 5.21–5.35 (m, 2H, $CH_2$); 5.90–6.07 (m, 1H, CH); 6.27 (d, J=5.5, 1H, CH); 7.08 (d, J=9.0, 2 aromatic H);7.38 (d, J=9.0, 2 aromatic H). MS: 234 (2, $[M^+]$), 192 (28), 150 (61), 132 (71), 43 (100).

EXAMPLE 2

(rac)-acetic acid 1-(4-acetoxy-3-methoxyphenyl)-allyl ester (2)

According to the general procedure 97.2 g (4 mol) Mg turnings, 192.6 g (1.8 mol) vinyl bromide and 76.05 g (0.5 mol) vanillin are reacted to give 92.5 g crude diol. Acetylation of this material using 97.0 ml (1.03 mol) $Ac_2O$, 145 ml pyridine and 560 mg DMAP gave 85.7 g (63% by weight) of pure compound 2 in form of a yellowish solid having the following $^1H$ NMR ($CDCl_3$) values: 2.12 (s, $CH_3$); 2.31 (s, $CH_3$); 3.83 (s, $OCH_3$); 5.22–5.38 (m, 2H, $CH_2$); 5.90–6.08 (m, 1H, CH); 6.25 (d, J=5.5, 1H, CH); 6.90–7.05 (m, 3 aromatic H). MS: 264 (6, $[M^+]$), 222 (43), 180 (100), 162 (70), 43 (69).

EXAMPLE 3

(rac)-propionic acid 1-(4-propionoxy-3-methoxyphenyl)-allyl ester (3)

Esterification of 1.8 g (10 mmol) 4-(1-hydroxy-allyl)-2-methoxy-phenol with 2.6 ml (20 mmol) propionic anhydride and 10.8 mg DMAP in 2.8 ml pyridine, according to the general procedure known per se, gave 2.68 g (92% by weight) of compound 3 in form of a colorless oil having the following $^1H$ NMR ($CDCl_3$) values: 1.16 (t, J=7.5, $CH_3$); 1.27 (t, J=7.5, $CH_3$); 2.40 (q, J=7.5, $CH_2$); 2.61 (q, J=7.5, $CH_2$); 3.83 (s, $OCH_3$); 5.21–5.36 (m, 2H, $CH_2$); 5.90–6.08 (m, 1H, CH); 6.27 (d, J=5.5, 1H, CH); 6.90–7.05 (m, 3 aromatic H). MS: 292 (3, $[M^+]$), 236 (30), 180 (100), 162 (73), 57 (62).

EXAMPLE 4

(rac)-propionic acid 1-(4-propionoxy-phenyl)-allyl ester (4)

Esterification of 1.0 g (6.65 mmol) 4-(1-hydroxy-allyl)-phenol with 1.7 ml (13.3 mmol) propionic anhydride and 7.2 mg DMAP in 1.9 ml pyridine according to the general procedure known per se gave 1.52 g (87% by weight) of compound 4 in form of a colorless oil having the following $^1H$ NMR ($CDCl_3$) values: 1.15 (t, J=7.5, $CH_3$); 1.26 (t, J=7.5, $CH_3$); 2.38 (q, J=7.5, $CH_2$); 2.59 (q, J=7.5, $CH_2$); 5.20–5.35 (m, 2H, $CH_2$); 5.90–6.08 (m, 1H, CH); 6.28 (d, J=5.5, 1H, CH); 7.08 (d, J=9.0, 2 aromatic H); 7.36 (d, J=9.0, 2 aromatic H). MS: 262 (1, $[M^+]$), 206 (34), 150 (90), 132 (100), 57 (84).

EXAMPLE 5

(rac)-isobutyric acid 1-(4-isobutyryloxy-phenyl)-allyl ester (5)

Esterification of 1.5 g (10.0 mmol) 4-(1-hydroxy-allyl)-phenol with 3.3 ml (20.0 mmol) isobutyric anhydride and 20.3 mg DMAP in 2.8 ml pyridine according to the general procedure gave 2.4 g (83% by weight) of compound 5 in form of a colorless oil having the following $^1H$ NMR ($CDCl_3$) values: 1.17 (d, J=7.0, $CH_3$); 1.20 (d, J=7.0, $CH_3$); 1.31 (d, J=7.0, 2 $CH_3$); 2.60 (m, J=7.0, 2CH); 2.80 (m,J=7.0, 2CH); 5.20–5.35 (m, 2H, $CH_2$); 5.90–6.08 (m, 1H, CH); 6.26 (d, J=6.0, 1H, CH); 7.07 (d, J=9.0, 2 aromatic H); 7.37 (d, J=9.0, 2 aromatic H). MS: 290 (0.5, $[M^+]$), 220 (9), 150 (20), 71 (48), 43 (100).

EXAMPLE 6

(rac)-acetic acid 1-(4-acetoxy-phenyl)-propyl ester (6)

According to the general procedure known per se 72.9 g (3 mol) Mg turnings, 160.5 g (1.5 mol) ethyl bromide and 61.05 g (0.5 mol) 4-hydroxy-benzaldehyde are reacted to give 71.1 g crude diol. Acetylation of 56 g of this material using 70 ml (0.74 mol) $Ac_2O$, 104.6 ml pyridine and 750 mg DMAP gave 58.2 g (63% by weight) of pure compound 6 in form of a white solid having the following $^1H$ NMR ($CDCl_3$) values: 0.88 (t, J=7.0, $CH_3$); 1.70–2.00 (m, $CH_2$); 2.08 (s, $CH_3$); 2.30 (s, $CH_3$); 5.66 (t, J=6.0, 1H, CH); 7.05 (d, J=9.0, 2 aromatic H); 7.34 (d, J=9.0, 2 aromatic H). MS: 236 (2, $[M^+]$), 194 (15), 165 (22), 123 (70), 43 (100).

EXAMPLE 7

(rac)-acetic acid 1-(4-acetoxy-3-methoxy-phenyl)-propyl ester (7)

According to the general procedure known per se 72.9 g (3 mol) Mg turnings, 160.5 g (1.5 mol) ethyl bromide and 76.05 g (0.5 mol) vanillin are reacted to give 98.2 g crude diol. Acetylation of 80 g of this material using 83.3 ml (878 mmol) $Ac_2O$, 124 ml pyridine and 890 mg DMAP gave 85.9 g (79% by weight) of pure compound 7 in form of a white solid having the following $^1H$ NMR ($CDCl_3$) values: 0.90 (t, J=7.0, $CH_3$); 1.70–2.00 (m, 2H, $CH_2$); 2.09 (s, $CH_3$); 2.31 (s, $CH_3$); 3.85 (s, $OCH_3$); 5.65 (t, J=6.0, 1H, CH); 6.87–7.03 (m, 3 aromatic H). MS: 266 (3, $[M^+]$), 224 (23), 195 (12), 164 (17), 153 (72), 43 (100).

EXAMPLE 8

(rac)-formic acid 1-(4-formyloxy-phenyl)-allyl ester (8)

Formylation of 1.0 g (6.6 mmol) 4-(1-hydroxy-allyl)-phenol with 2.4 g (26.6 mmol) formylation reagent (prepared from 2.7 g acetic anhydride, 1.2 g formic acid and 2 mg pyridine) in 3.3 ml of benzene gave 23.5 mg formate 8 after workup and flash chromatography, formate 8 having the following $^1H$ NMR ($CDCl_3$) values: 5.25–5.40 (m, 2H, $CH_2$); 5.90–6.08 (m, 1H, CH); 6.38 (d, J=6.0, 1H, CH); 7.15 (d, J=9.0, 2 aromatic H); 7.43 (d, J=9.0, 2 aromatic H); 8.15 (s, HCO); 8.30 (s, HCO). MS: 206 (10, $[M^+]$), 179 (18), 132 (62), 105 (42), 77 (100).

EXAMPLE 9

(rac)-acetic acid 1-(4-acetoxyphenyl)-3-butenyl ester (9)

According to the general procedure known per se 182.2 g (7.5 mol) Mg turnings, 302.4 g (2.5 mol) allyl bromide and 61.1 g (0.5 mol) 4-hydroxy-benzaldehyde are reacted to give 24.4 g crude diol (containing 43% by weight starting material). Acetylation of this material using 32.3 ml (340 mmol) $Ac_2O$, 48.3 ml pyridine and 348.0 mg DMAP gave 12.3 g (10% by weight) of pure compound 9 in the form of a yellowish oil after chromatography, compound 9 having the following $^1H$ NMR ($CDCl_3$) values: 2.06 (s, $CH_3$); 2.30

(s, CH$_3$);2.45–2.73 (m, 2H, CH$_2$); 5.02–5.14 (m, 2H); 5.58–5.85 (m, 2H); 7.05 (d, J=9.0, 2 aromatic H); 7.35 (d, J=9.0, 2 aromatic H). MS: 248 (0.1,[M$^+$]), 207 (21), 165 (48), 123 (98), 43 (100).

EXAMPLE 10

(rac)-acetic acid 1-(4-acetoxyphenyl)-2-propynyl ester (10)

To a 30–35° warm suspension of sodium acetylide in xylene (60.0 g, 12%) is added a solution of 6.1 g 4-hydroxybenzaldehyde in 20 ml THF. The reaction mixture is stirred at r.t. for 4 days. Workup following the general procedure gave 480 mg (6.5% by weight) diol in form of a yellowish solid. Acetylation of 200 mg (1.3 mmol) of this material with 0.26 ml (2.7 mmol) Ac$_2$O, 0.4 ml pyridine and 2.7 mg DMAP gave 200 mg (64% by weight) of pure compound 10 in the form of a colorless oil having the following $^1$H NMR (CDCl$_3$) values: 2.12 (s, CH$_3$); 2.31 (s, CH$_3$); 2.66 (d, J=1.5, CH); 6.45 (d, J=1.5, CH); 7.12 (d, J=9.0, 2 aromatic H); 7.57 (d, J=9.0, 2 aromatic H). MS: 232 (5, [M$^+$]), 190 (12), 148 (22), 130 (100), 43 (89).

EXAMPLE 11

(rac)-acetic acid 1-(4-acetoxyphenyl)-2-methyl-allyl ester (11)

According to the general procedure 12.15 g (0.5 mol) Mg turnings, 30.2 g (0.25 mol) bromopropene and 6.1 g (0.05 mol) 4-hydroxy-benzaldehyde are reacted to give 7.5 g crude diol. Acetylation of 2.0 g of this material using 2.3 ml (24.4 mmol) Ac$_2$O, 3.4 ml pyridine and 25.0 mg DMAP gave 2.6 g (78% by weight) of pure compound 11 in the form of a colorless oil having the following $^1$H NMR (CDCl$_3$) values: 1.62 (s, CH$_3$); 2.12 (s, CH$_3$); 2.30 (s, CH$_3$); 4.98 (s, 1H, CH$_2$); 5.11 (s, 1H, CH$_2$); 6.17 (s, 1H, CH); 7.06 (d, J=9.0, 2 aromatic H); 7.36 (d, J=9.0, 2 aromatic H). MS: 248 (1, [M$^+$]), 206 (35), 164 (40), 146 (57), 43 (100).

EXAMPLE 12

(rac)-acetic acid 1-(4-acetoxy-3-methoxyphenyl)-ethyl ester (12)

According to the general procedure 14.58 g (0.6 mol) Mg turnings, 42.6 g (0.3 mol) iodomethane and 15.22 g (0.1 mol) vanillin are reacted to give 14.1 g crude diol. Acetylation of 3.0 g of this material using 3.4 ml (35.7 mmol) Ac$_2$O, 5.0 ml pyridine and 36.0 mg DMAP gave 3.5 g (65% by weight) of pure compound 12 in the form of a yellowish oil having the following $^1$H NMR (CDCl$_3$) values: 1.52 (d, J=7.0, CH$_3$); 2.07 (s, CH$_3$); 2.30 (s, CH$_3$); 3.84 (s, OCH$_3$); 5.87 (q, J=7.0, 1H, CH); 6.90–7.04 (m, 3 aromatic H). MS: 252 (8, [M$^+$]), 210 (93), 168 (40), 150 (85), 43 (100).

EXAMPLE 13

(rac)-acetic acid 1-(4-acetoxy-3-methoxyphenyl)-2-methyl-allyl ester (13)

According to the general procedure 14.58 g (0.6 mol) Mg turnings, 36.3 g (0.3 mol) 2-bromo-propene and 15.22 g (0.1 mol) vanillin are reacted to give 20.78 g crude diol. Acetylation of 5.0 g of this material using 4.9 ml (51.5 mmol) Ac$_2$O, 7.3 ml pyridine and 52.4 mg DMAP gave 5.84 g (82% by weight) of pure compound 13 in the form of a yellowish oil having the following $^1$H NMR (CDCl$_3$) values: 1.66 (s, CH$_3$); 2.12 (s, CH$_3$); 2.30 (s, CH$_3$); 3.82 (s, OCH$_3$); 4.98 (s, 1H, CH$_2$); ); 5.11 (s, 1H, CH$_2$); 6.05 (s, 1H, CH); 6.90–7.02 (m, 3 aromatic H). MS: 278 (7, [M$^+$]), 236 (54), 194 (100), 176 (75), 43 (96).

EXAMPLE 14

(rac)-acetic acid 1-(4-acetoxy-3-methoxyphenyl)-2-methyl-propyl ester (14)

1.0 g (3.6 mmol) diacetate 13 is dissolved in 17 ml EtOH and hydrogenated over PtO$_2$. The catalyst is removed by filtration over Celite and the solvent is evaporated. Flash chromatography of the crude product gave 0.83 g (82% by weight) of compound 14 in the form of a yellowish oil having the following $^1$H NMR (CDCl$_3$) values: 0.81 (d, J=7.0, CH$_3$); 0.98 (d, J=7.0, CH$_3$); 1.98–2.15 (m, 1H, CH); 2.08 (s, CH$_3$); 2.30 (s, CH$_3$); 3.82 (s, OCH$_3$); 5.46 (d, J=7.0, CH); 6.84–7.02 (m, 3 aromatic H). MS 280 (8, [M$^+$]), 238 (38), 195 (56), 153 (100), 43 (68).

EXAMPLE 15

(rac)-acetic acid 4-(1-acetoxy-butyl)-phenyl ester (15)

1.0 g (4 mmol) diacetate 9 is dissolved in 19 ml EtOH and hydrogentated over 50 mg PtO$_2$. The catalyst is removed by filtration over Celite and the solvent is evaporated. Flash chromatography of the crude product gave 0.92 g (91% by weight) of compound 15 in the form of a yellowish oil having the following $^1$NMR (CDCl$_3$) values: 0.92 (t, J=7.0, CH$_3$); 1.15–1.45 (m, 2H, CH$_2$); 1.62–2.00 (m, 2H, CH$_2$); 2.05 (s, CH$_3$); 2.30 (s, CH$_3$); 5.74 (t, J=7.0, CH); 7.06 (d, J=9.0, 2 aromatic H). 7.34 (d, J=9.0, 2 aromatic H). MS: 250 (2, [M$^+$]), 208 (19), 165 (32), 123 (68), 43 (100).

EXAMPLE 16

(rac)-acetic acid 4-(acetoxy-phenyl-methyl)-2-methoxy-phenyl ester (16)

According to the general procedure 7.3 g (0.3 mol) Mg turnings, 23.6 g (0.15 mol) bromo-benzene and 7.6 g (0.05 mol) vanillin are reacted to give 7.5 g (65% by weight) diol after crystallization. Acetylation of 3.0 g (13 mmol) of this material using 2.7 ml (28.5 mmol) Ac$_2$O, 3.8 ml pyridine and 50 mg DMAP gave, after crystallization, 1.13 g (28% by weight) of pure compound 16 in form of white crystals, compound 16 having the $^1$H NMR (CDCl$_3$) values: 2.15 (s, CH$_3$); 2.29 (s, CH$_3$); 3.78 (s, CH$_3$); 6.85–7.05 (m, 4 aromatic H); 7.45 (s, 5 aromatic H); MS: 314 (17, [M$^+$]), 272 (68), 212 (100), 152 (15), 105 (12), 43 (100).

The compounds of formula I have been tested for their capability to impart warm/hot, spicy and pungent sensations to the oral cavity by preparing an aqueous solution at concentrations ranging from 10 to 2000 ppm, preferably at a concentration of 100 ppm, and evaluation of the solution by an expert panel consisting of 4 persons.

Compounds of formula I exhibit a nice warm/hot, spicy and pungent sensation at concentrations ranging from 10 to 2000 ppm. Normally this sensation is perceived after a delay time ranging from 5 to about 60 seconds after tasting, depending on the panelist.

After removal of the test solution from the oral cavity the warm/hot spicy and pungent sensation disappears within a short time (individually from a few seconds to about half a minute). In contrast to compounds such as capsaicin, piperine and gingerol no lingering of the hot/warming, spicy and pungent sensation was observed.

The hot/warm, spicy and pungent sensation imparted by the compounds of formula I is perceived in the oral cavity on locations different from the locations where the pungency of capasaicin is perceived.

In addition, use of the compounds of formula I have been tested in foods, beverages and consumer healthcare products. Compounds of formula I were added to these products at concentrations ranging from 100 to 2000 ppm, preferably at a concentration of 500 ppm and were evaluated by an expert panel consisting of 4 persons. Accordingly, a warm/ hot, spicy and pungent sensation was imparted to these products, as exemplified below.

EXAMPLE 17

A stock solution containing 1% by weight of the active ingredient compound of formula I in 1,2-propylene glycol (flavor quality) was prepared. Gentle heating was applied to solubilize the active ingredient. Then 0.5 g of this stock solution was submerged in 50 g of water containing 1% by weight of ethyl alcohol. The solution thus prepared, containing 100 ppm of the active ingredient of formula I, was evaluated by the expert panel. A warm/hot, spicy and pungent sensation was perceived after a delay time of 5 to about 60 seconds.

EXAMPLE 18

50 Proof cordial base was prepared by mixing medium invert sugar (30 parts), glycerine (1 part), ethyl alcohol 190 (26.3 parts) and water (42.7 parts); cordial base was then flavored with cinnamon flavor at 0.2% by weight (cinnamon flavors used are commercially available from Givaudan Roure Flavors) and 100 ppm of compound 7 as described and prepared according to example 17. A cordial base having enhanced warm/hot, pungent flavor was obtained.

EXAMPLE 19

Mouthwash base was prepared by mixing 0.08 parts mouthwash flavor (commercially available from Givaudan Roure Flavors Ltd.), 0.5 parts Pluronic F-127, 0.5 parts polysorbate 20, 0.35 parts sodium lauryl sulfate, 5 parts glycerine, 0.015 parts sodium saccharin and 93.555 parts water. The mouthwash base was blended separately with 100 ppm of each of the compounds 1, 3, 4, 5, 6, 7 and 9, respectively, as described and prepared according to the examples. The mouthwash bases imparted a warm/hot, spicy and pungent sensation.

EXAMPLE 20

Toothpaste base (Opaque 13/02-5F) was flavored with peppermint flavor (Givaudan Roure peppermint flavor 10570-34) at 0.5% by weight. The toothpaste base was blended separately with 100 ppm of each of the compounds 1, 6, 7 and 9, respectively, as described and prepared according to the examples 1, 6, 7 and 9. The toothpaste bases had a warm/hot, spicy and pungent character.

EXAMPLE 21

Mayonnaise base was prepared by mixing 59.8 parts whole egg, 24 parts vinegar (white, 5% acidity), 1.3 parts mustard, 2 parts sugar, 1 part salt and 219 parts vegetable oil. The mayonnaise base was blended with 500 ppm of each of the compounds 1, 6, 7 and 9, respectively, as described and prepared according to the examples 1, 6, 7 and 9. The mayonnaise bases had a warm/hot, spicy and pungent character.

EXAMPLE 22

500 ppm of compounds 1, 6, 7 and 9, respectively, were blended with regular fat sour cream. The sour creams had a warm/hot, spicy and pungent character without a lingering effect.

EXAMPLE 23

An onion dip was prepared by mixing a commercial package of onion soup mix (Lipton) with plain, regular fat sour cream and 1000 ppm of compound 9 as described and prepared according to example 9. The onion dip had a warm/hot, peppery and pungent character without a lingering effect.

EXAMPLE 24

A vegetable dip was prepared by mixing a commercial vegetable soup mix (Knorr, 1 package) with 470 ml plain, regular fat sour cream and 500 ppm of each of the compounds 1, 6, 7 and 9, as described and prepared according to the examples 1, 6, 7, and 9. The vegetable dip had a warm/hot, peppery and pungent character without any lingering effect.

EXAMPLE 25

2.5 parts Maltrin M-10 (commercially available) was mixed with 0.05 parts pizza flavor (SNE Pizza Flavor 810841). 50 parts Potato chips (Pringles) were placed on a paper plate and then microwaved for 30–60 seconds until surface oil glistened. The chips were transfered to a ziploc bag where they were dusted with 1000 ppm of compound 6 as described and prepared according to example 6. The Pizza snack had a warm/hot, peppery and pungent character as described and prepared according to example 6.

EXAMPLE 26

A chewing gum was prepared according to methods known to those skilled in the art. Ingredients used were 240 g gum base (Canigo-T, Cafosa Gum SA., Barcelona), 200 g glucose syrup (DE 38-40, 43° Bé), 560 g icing sugar, 10 g citric acid, 7 g orange flavor (commerical by available from Givaudan Roure Flavor) and 1 g of compound 2 as described and prepared according to example 2. The orange flavored chewing gum had a warm/hot, peppery and pungent character, again without any lingering effect.

While the invention has been illustrated and described with respect to illustrative embodiments and modes of practice, it will be apparent to those skilled in the art that various modifications and improvements may be made without departing from the scope and spirit of the invention. Accordingly, the invention is not to be limited by the illustrative embodiments and modes of practice.

We claim:

1. A flavorant composition comprising at least one compound selected from the group consisting of

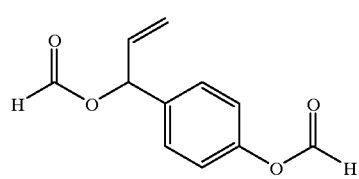

a)

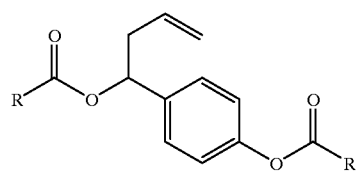

e)

f)
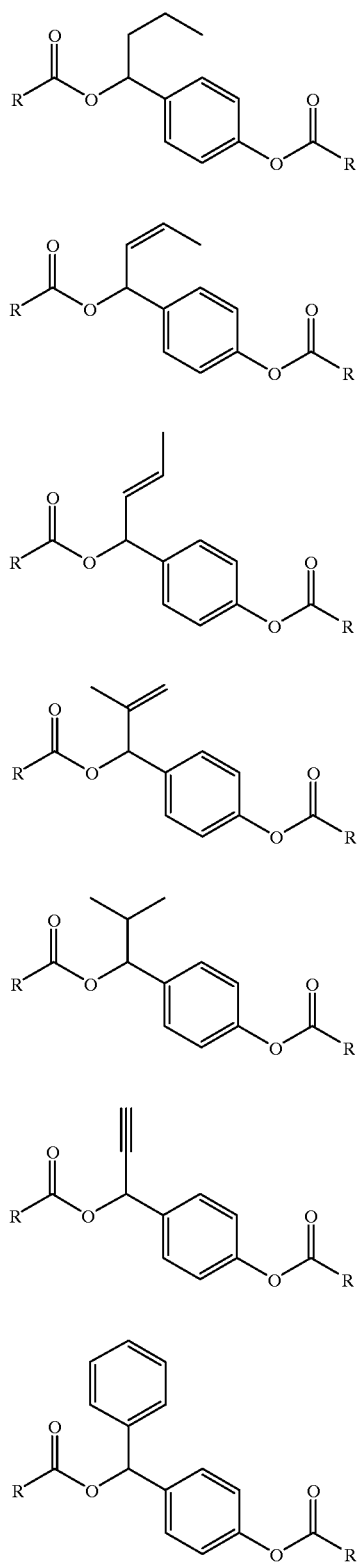
g)
h)
i)
j)
k)
l)
m)
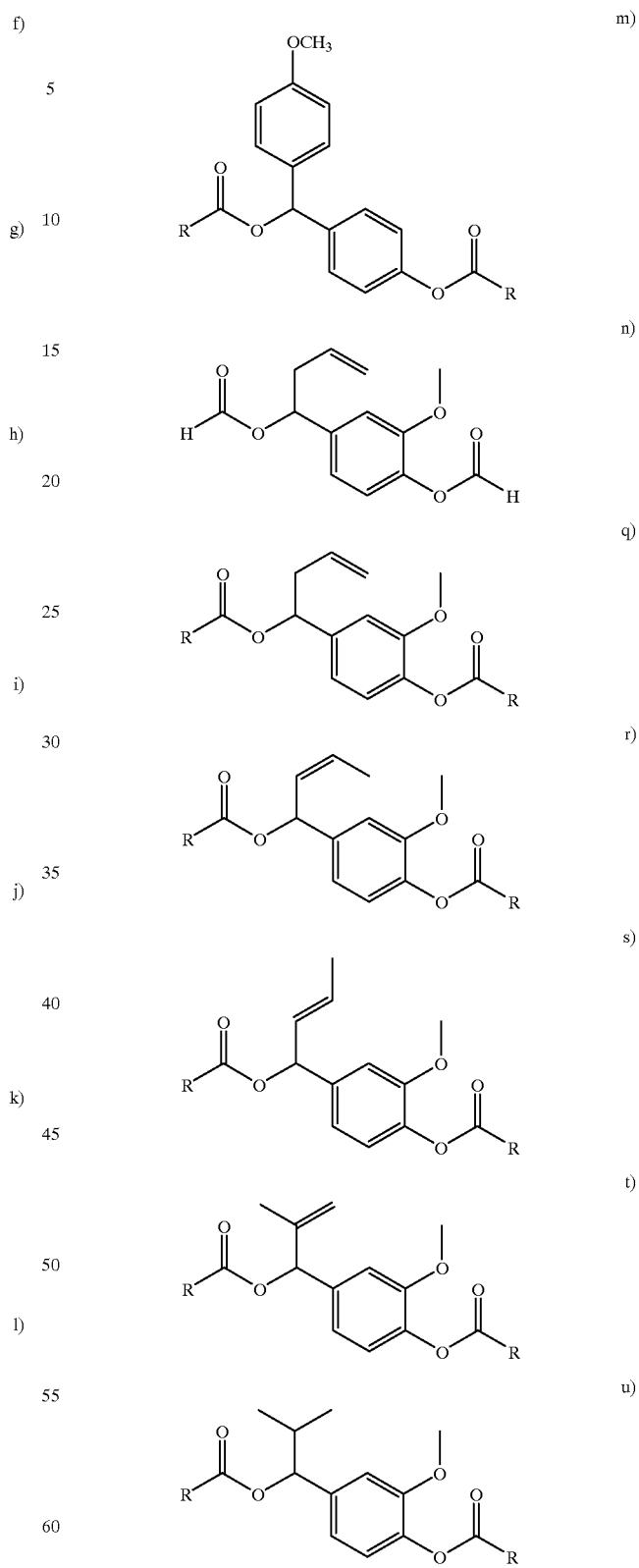
n)
q)
r)
s)
t)
u)

v)
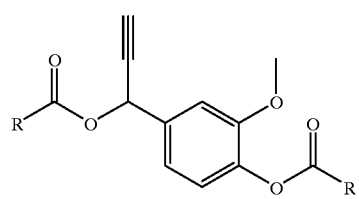
wherein R is H, CH$_3$, CH$_2$CH$_3$, or CH(CH$_3$)$_2$, and a carrier for the compound.
2. A flavorant composition according to claim 1 comprising at least once compound selected from the group consisting of
k)
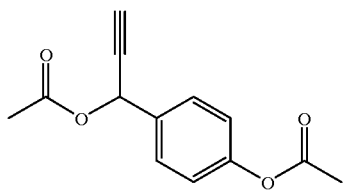
v)
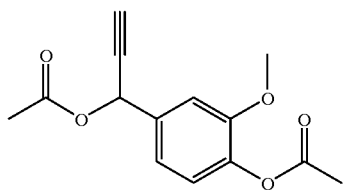
i)
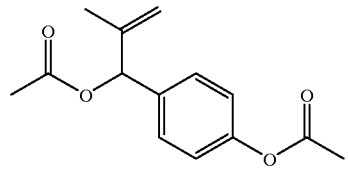
t)
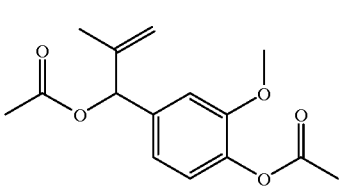
j)
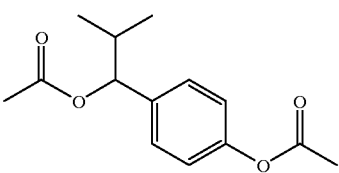
u)
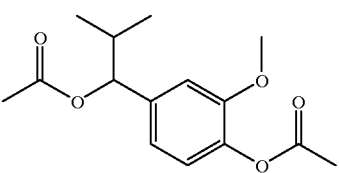
e)
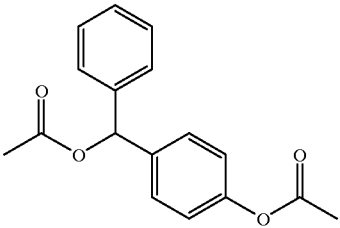
* * * * *

UNITED STATES PATENT AND TRADEMARK OFFICE
CERTIFICATE OF CORRECTION

PATENT NO.   : 6,203,839 B1  
DATED         : March 20, 2001  
INVENTOR(S)  : Jean-Pierre Bachmann et al.

Page 1 of 1

It is certified that error appears in the above-identified patent and that said Letters Patent is hereby corrected as shown below:

Column 12,  
Line 12, "MS 280" should be -- MS:280 --  
Line 21, "$^1$NMR" should be -- $^1$H NMR --

Column 18, claim 2,  
Line 40, at the end of the claim insert

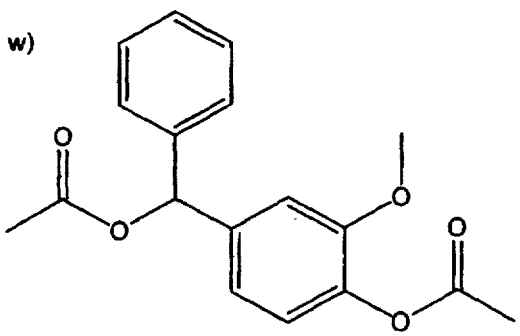

Signed and Sealed this

Nineteenth Day of February, 2002

Attest:

JAMES E. ROGAN  
*Attesting Officer*  *Director of the United States Patent and Trademark Office*

UNITED STATES PATENT AND TRADEMARK OFFICE
CERTIFICATE OF CORRECTION

PATENT NO. : 6,203,839 B1  Page 1 of 1
DATED : March 20, 2001
INVENTOR(S) : Jean-Pierre Bachmann et al.

It is certified that error appears in the above-identified patent and that said Letters Patent is hereby corrected as shown below:

Column 17,
Line 10,

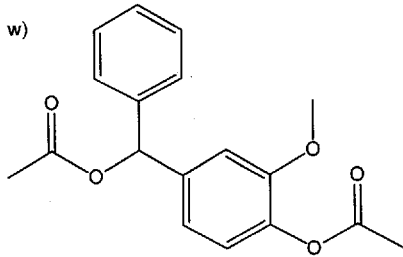

Signed and Sealed this

Twenty-first Day of January, 2003

JAMES E. ROGAN
*Director of the United States Patent and Trademark Office*